(12) United States Patent
Chao et al.

(10) Patent No.: US 8,872,479 B2
(45) Date of Patent: Oct. 28, 2014

(54) SYSTEM FOR ACTIVELY MANAGING ENERGY BANKS DURING ENERGY TRANSFER AND RELATED METHOD

(75) Inventors: Emil Yuming Chao, Laguna Hills, CA (US); Charles Chang, Coto De Caza, CA (US)

(73) Assignee: International Rectifier Corporation, El Segundo, CA (US)

( * ) Notice: Subject to any disclaimer, the term of this patent is extended or adjusted under 35 U.S.C. 154(b) by 368 days.

(21) Appl. No.: 13/247,632

(22) Filed: Sep. 28, 2011

(65) Prior Publication Data

US 2013/0076311 A1    Mar. 28, 2013

(51) Int. Cl.
*H02J 7/00* (2006.01)

(52) U.S. Cl.
CPC ........................................ *H02J 7/00* (2013.01)
USPC ......................................................... 320/134

(58) Field of Classification Search
USPC ......................................................... 320/134
See application file for complete search history.

(56) References Cited

U.S. PATENT DOCUMENTS

| | | | |
|---|---|---|---|
| 4,713,597 A * | 12/1987 | Altmejd | 320/122 |
| 5,889,385 A | 3/1999 | Podrazhansky | |
| 5,905,360 A | 5/1999 | Ukita | |
| 6,771,045 B1 | 8/2004 | Keller | |
| 7,609,031 B2 | 10/2009 | Benckenstein | |
| 2007/0080664 A1* | 4/2007 | Maguire et al. | 320/116 |
| 2007/0216369 A1 | 9/2007 | Chandler | |
| 2008/0233471 A1 | 9/2008 | Aumayer | |
| 2009/0072788 A1 | 3/2009 | Delaille | |
| 2012/0049801 A1 | 3/2012 | Chang | |
| 2012/0049833 A1 | 3/2012 | Chang | |

FOREIGN PATENT DOCUMENTS

WO    WO 95/15604    6/1995

OTHER PUBLICATIONS

U.S. Appl. No. 13/247,632, filed Sep. 28, 2011, Chao.
U.S. Appl. No. 13/194,073, filed Jul. 29, 2011, Chao.

* cited by examiner

*Primary Examiner* — Arun Williams
(74) *Attorney, Agent, or Firm* — Farjami & Farjami LLP

(57) ABSTRACT

According to one embodiment, a system for actively managing energy banks during an energy transfer process comprises a plurality of energy banks configured for use as a group of energy banks and characterized by a desired state-of-charge (SOC), and a power management system coupled across each of the energy banks. The power management system is configured to selectively drive at least one of the energy banks to a modified SOC different from the desired SOC without interrupting the energy transfer process. In one embodiment, the power management system is further configured to return the energy bank or banks driven to the modified SOC to the desired SOC of the group of energy banks.

20 Claims, 4 Drawing Sheets

SYSTEM FOR ACTIVELY MANAGING ENERGY BANKS DURING ENERGY TRANSFER AND RELATED METHOD

BACKGROUND OF THE INVENTION

1. Field of the Invention

The present invention is generally in the field of electrical circuits and systems. More specifically, the present invention is in the field of power management circuits and systems.

2. Background Art

The storage and on-demand delivery of electrical energy is becoming increasingly important due to the ongoing shift from fossil fuel energy sources to environmentally more benign green energy technologies. Electric vehicles and gas/electric hybrid automobiles, for example, utilize arrays of secondary batteries implemented as battery packs that are typically discharged to provide vehicle propulsion and may be charged in response to a vehicle operation such as regenerative braking. The secondary battery packs may constitute a substantial portion of the cost of an electric or gas/electric hybrid vehicle, and their performance, and in particular their longevity, may significantly influence consumer willingness to invest in the initially costlier vehicle.

Energy storage packs, such as the secondary battery packs described above, are commonly assembled from individual batteries, each of which is often assumed or selected to be nominally identical. In practice, however, the batteries, or more generally any other types of energy banks, will have individual performance parameters, such as storage capacity and/or resistance, that vary somewhat from energy bank to energy bank. The distribution or variation among energy banks or batteries may arise, for example, from process variation at the time of manufacturing, from unequal wear during use cycles, and from other non-use related degradation of the energy banks. In general, the distribution of the energy bank variations often becomes wider as the energy banks grow older. Unfortunately, moreover, the longevity and capacity of a group of energy banks used collectively in an energy pack is typically determined by the weakest energy bank in the group. As a result, and in view of the high desirability of extending the lifetime of energy packs such as secondary battery packs, solutions for providing effective energy bank performance management are growing increasingly important.

Conventional approaches to providing management of battery performance, for example, have tended to focus on balancing one aspect of the batteries at a particular time (usually when the battery pack is not in use). At that time, the stronger batteries may be adjusted to a state-of-charge (SOC) corresponding to that of the weakest battery. For example, charge may be transferred from one battery to another (e.g., between adjacent batteries) while the battery pack is offline, until a substantially uniform SOC is achieved. However, in some implementations, it may be costly, inefficient, or otherwise undesirable to take an entire energy pack offline to perform battery management or maintenance operations.

Thus, there is a need to overcome the drawbacks and deficiencies in the art by providing a battery management solution for actively managing secondary batteries or other energy banks during energy transfer, thereby enabling improved performance and increased longevity by a collection of such energy banks implemented as an energy pack.

SUMMARY OF THE INVENTION

The present application is directed to a system for actively managing energy banks during energy transfer and related method, substantially as shown in and/or described in connection with at least one of the figures, and as set forth more completely in the claims.

DETAILED DESCRIPTION OF THE INVENTION

Figure 1:
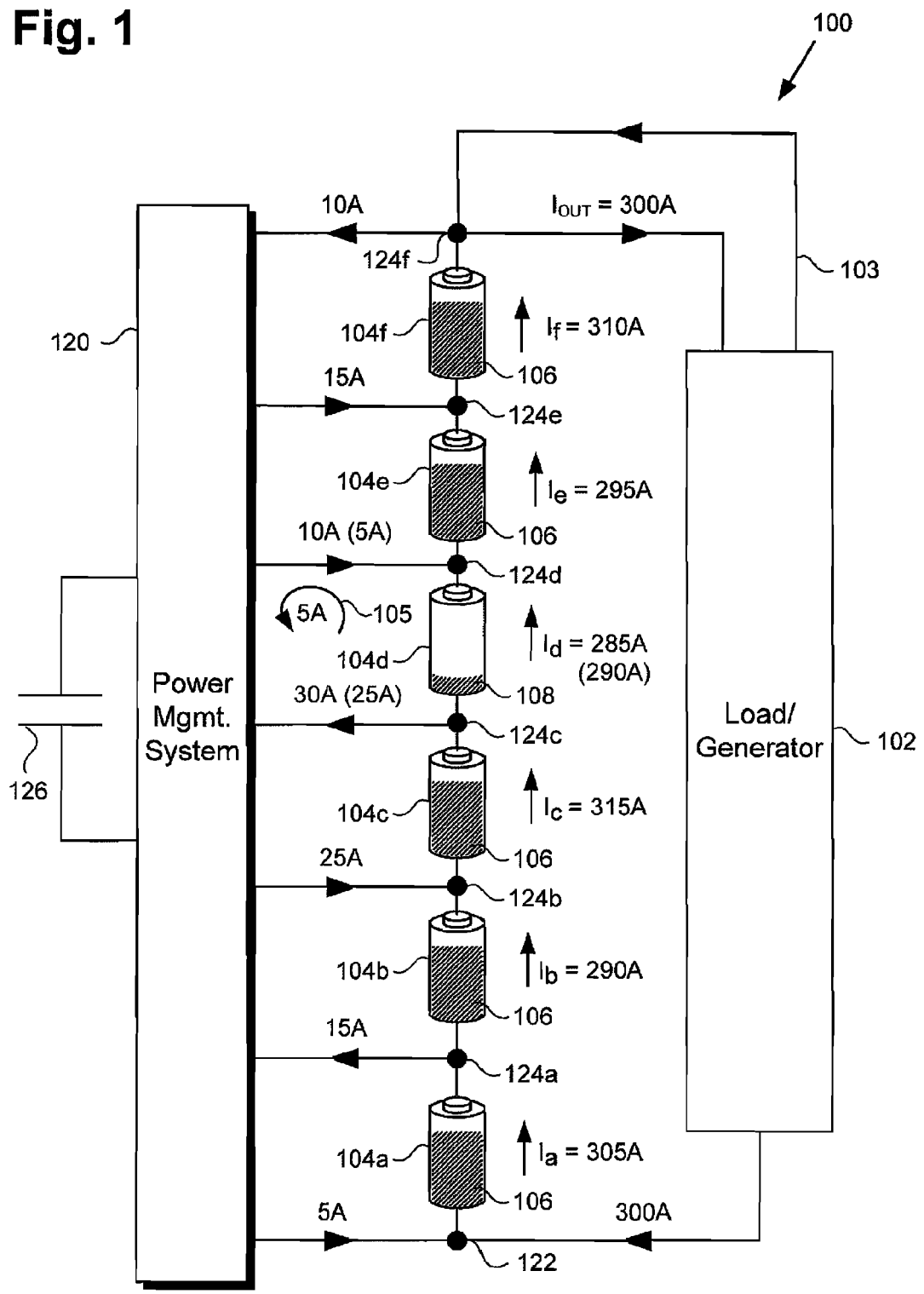
FIG. 1 is a diagram showing selected features of a system for actively managing energy banks during energy transfer and including a power management system, according to one embodiment of the present invention.

The present invention is directed to a system for actively managing energy banks during energy transfer, and a related method. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 is a diagram showing selected features of system 100 for actively managing energy banks during energy transfer and including power management system 120, according to one embodiment of the present invention. As shown in FIG. 1, system 100 comprises power management system 120 including low side reference node 122 and input/output (I/O) nodes 124a, 124b, 124c, 124d, 124e, and 124f (hereinafter "I/O nodes 124a-124f"). In addition, system 100 includes storage capacitor 126 utilized by power management system 120, and energy banks 104a, 104b, 104c, 104d, 104e, and 104f (hereinafter "energy banks 104a-104f") coupled in series and represented as batteries in FIG. 1.

As indicated in FIG. 1, according to the present embodiment, energy bank 104a is connected between low side reference node 122 and I/O node 124a, energy bank 104b is connected between I/O nodes 124a and 124b, energy bank 104c is connected between I/O nodes 124b and 124c, energy bank 104d is connected between I/O nodes 124c and 124d and so forth. That is to say, according to the embodiment of FIG. 1, power management system 120 is coupled across each of energy banks 104a-104f. In addition, FIG. 1 shows that energy banks 104a, 104b, 104c, 104e, and 104f are all characterized by state-of-charge (SOC) 106, which may be a substantially uniform SOC corresponding to a desired SOC of energy banks 104a-104f during normal operation. Moreover, according to the embodiment of FIG. 1, energy bank 104d is shown to have modified SOC 108, which is shown to be significantly different from SOC 106 characterizing energy banks 104a, 104b, 104c, 104e, and 104f.

It is noted that, as used in the present application, the expression "desired SOC" may refer to an SOC identified as optimal for the sustained performance and/or longevity of energy banks 104a-104f, for example. In some embodiments, such a desired SOC may correspond to an average SOC of energy banks 104a-104f during normal operation. Furthermore, in one embodiment, the desired SOC corresponding to SOC 106 may substantially equal the average SOC of energy banks 104a-104f during normal operation.

Also shown in FIG. 1 is load/generator 102, which may comprise a load drawing current $I_{OUT}$ from energy banks 104a-104f during an energy transfer process in which energy banks 104a-104f are discharged to deliver power to load/generator 102, for example. Alternatively, in embodiments in which energy banks 104a-104f comprise rechargeable secondary energy banks, such as secondary batteries for example, load/generator 102 may be a generator for charging energy banks 104a-104f during an energy transfer process in which energy banks 104a-104f are recharged. It is noted that the alternative representation of load/generator 102 as a charging system is depicted in FIG. 1 by recharge current path 103. Also shown in FIG. 1 are convergent 5 A and 300 A currents provided respectively by power management system 120 at low side node 122, located at the base of the energy stack comprising energy banks 104a-104f.

By way of perspective, in one embodiment, system 100 for actively managing energy banks 104a-104f during energy transfer may be implemented using nominally identical secondary batteries as energy banks 104a-104f. For example, each of energy banks 104a-104f may comprise rechargeable approximately 3.6 volt lithium-ion batteries, or lower voltage rechargeable nickel-metal hydride or silver oxide zinc batteries. Power management system 120 can be configured to provide individualized active power management for energy banks 104a-104f during charging of energy banks 104a-104f by load/generator 102, or during discharge or even heavy discharge of energy banks 104a-104f through load/generator 102.

In other words, in one embodiment, power management system 120 allows each of energy banks 104a-104f to have an individual discharge current, e.g., discharge currents $I_a$, $I_b$, $I_c$, $I_d$, $I_e$, and $I_f$ in FIG. 1, (hereinafter "discharge currents $I_a$-$I_f$") that differs from the average load/generator current, e.g., $I_{OUT}$. Those individual discharge currents can be selected to achieve and maintain balance of energy banks 104a-104f during all aspects of cell operation (e.g., charge, discharge, and storage). In addition, and as shown by the contrast between modified SOC 108 of energy bank 104d and substantially uniform SOC 106 common to energy banks 104a, 104b, 104c, 104e, and 104f, when advantageous for maintenance or diagnostic purposes, for example, power management system 120 can be used to selectively drive one or more of energy banks 104a-104f, e.g., energy bank 104d, to a modified SOC significantly different from a desired SOC characteristic of the group.

It is noted that although the various specific embodiments presented herein will represent energy banks such as energy banks 104a-104f as secondary batteries for the purposes of illustrating the present inventive concepts, that characterization should not be interpreted as limiting. For instance, system 100 may include fewer, and will often include many more energy banks than the six energy banks shown in FIG. 1. Furthermore, although energy banks 104a-104f are characterized as secondary batteries capable of being charged as well as discharged, in one embodiment, energy banks 104a-104f may comprise primary batteries and power management system 120 may be implemented to dynamically manage power during battery discharge only. In other embodiments, energy banks 104a-104f can comprise any suitable charge storage devices, such as rechargeable automotive or industrial batteries, fuel cells, supercapacitors, or energy storage devices used in a utility power grid or energy generation system, such as photovoltaic cells or panels, for example.

Moreover, and more generally, "energy bank" as used herein, can comprise a single unit cell, such as a battery cell, or several cells connected together. In various embodiments, the energy banks may be connected in series and managed as a group, connected in parallel and managed as a group, or may be implemented using a combination of those arrangements, such as one or more series connected groups of energy banks and one or more parallel connected groups of energy banks managed together as a super-group, for example. It is further noted that energy banks 104a-104f can be of the same nominal type, or energy banks 104a-104f can comprise a mix of energy banks using different energy storage technologies.

It is noted that even when nominally identical energy banks are implemented as energy banks 104a-104f, each bank will have its own individual characteristics, such as charge capacity, which collectively establish a variance distribution around the nominal values identified as characteristic of the group. By recognizing that those variances exist, and are in fact inevitable across any collection of energy banks, and by further configuring an energy management system to actively diagnose and compensate for those variances, embodiments of the present inventive concepts enable a collection of energy banks, such as energy banks 104a-104f to function more efficiently, more reliably, and may extend the lifetime of an energy pack including energy banks 104a-104f.

In a conventional system, the discharge or charge current for each energy bank is typically the same. Consequently, all energy banks charge and discharge at different rates, resulting in an increasing spread in their respective states-of-charge during charge and discharge, and causing the useable range of the energy pack to be limited by the weakest energy bank. However, through implementation of the active management approach disclosed by the present application, power management system 120 can be used to source or sink supplemental currents through I/O nodes 124a-124f. As will be further described below in conjunction with flowchart 400 of FIG. 4, those supplemental currents can be selected to achieve and maintain a balanced SOC operation amongst energy banks 104a-104f. In addition, those supplemental currents can be used to selectively drive one or more of energy banks 104a-104f to a modified SOC significantly different from the desired SOC of the remaining balanced energy banks for diagnostic, maintenance, or other purposes without interrupting the energy transfer process between the energy pack comprising energy banks 104a-104f and load/generator 102.

Figure 2:
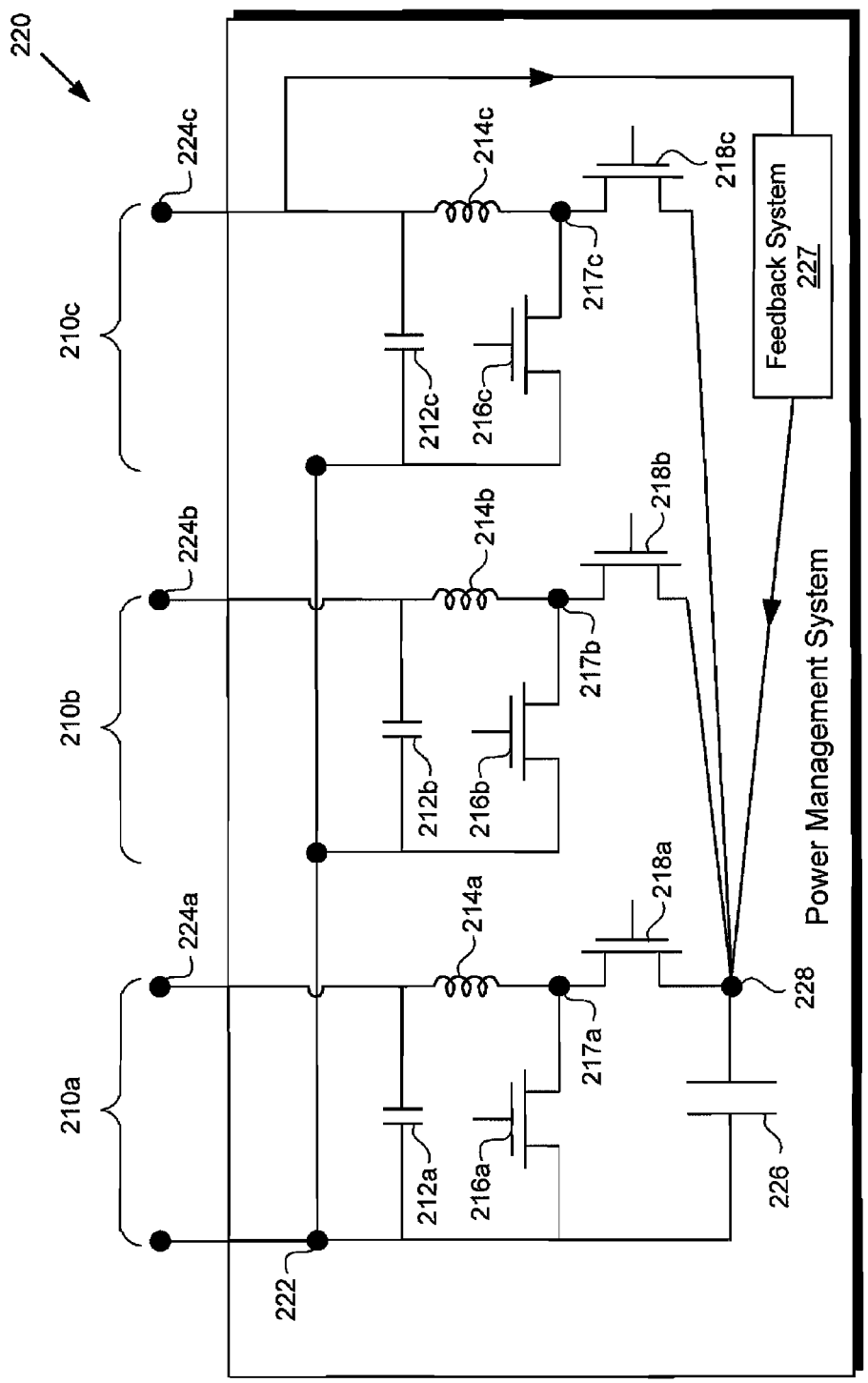
FIG. 2 is a diagram showing a more detailed representation of a power management system for use in a system for actively managing energy banks during energy transfer, according to one embodiment of the present invention.

Turning to FIG. 2, FIG. 2 is a diagram showing a more detailed representation of power management system 220, according to one embodiment of the present invention. Power management system 220 having low side reference node 222 and I/O nodes 224a, 224b, and 224c (hereinafter "I/O nodes 224a-224c") corresponds to power management system 120 including low side reference node 122 and I/O nodes 124a, 124b, and 124c, in FIG. 1. It is noted that FIG. 2 shows fewer I/O nodes than FIG. 1 in order to depict the internal circuitry of power management system 220, according to the embodiment of FIG. 2, more clearly. However, one of ordinary skill in the art will recognize that the embodiment of FIG. 2 may be readily scaled to support six I/O nodes, as in FIG. 1, or many more, for example.

As shown in FIG. 2, each of I/O nodes 224a-224c is associated with a corresponding bi-directional power transfer unit of power management system 220, e.g., respective bi-directional power transfer units 210a, 210b, and 210c (hereinafter "bi-directional power transfer units 210a-210c"). As further shown in FIG. 2, power management system 220 may also comprise storage capacitor 226 coupled between high side reference node 228 of power management system 220 and low side reference node 222, and feedback system 227. Storage capacitor 226 serves as a temporary storage node for power management system 220, and in that capacity corresponds to storage capacitor 126, in FIG. 1. Feedback system 227 may be used to keep storage capacitor 226 at a desired operating voltage, or within a desired operating voltage range. For example, feedback system 227 can be configured to draw energy from the top of the energy storage stack, e.g., node 224c in the embodiment of FIG. 2 or node 124f in the embodiment of FIG. 1, in order to compensate for system losses, such as power converter loss, or mismatch in a balance algorithm used by the system comprising power management system 220 to manage energy banks coupled to I/O nodes 224a-224c.

Bi-directional power transfer unit 210a may include capacitor 212a, inductor 214a, low side switch 216a, and high side switch 218a. As shown in FIG. 2, low side switch 216a and high side switch 218a are arranged in a half bridge configuration having switching node 217a coupled to I/O node 224a by inductor 214a. Similarly, each of bi-directional power transfer units 210b and 210c may include respective capacitors 212b and 212c, inductors 214b and 214c, as well as low side switches 216b and 216c and high side switches 218b and 218c arranged in half bridge configurations having switching nodes 217b and 217c.

As may be seen from FIG. 2, corresponding terminals of low side switches 216a, 216b, and 216c, are directly connected to low side reference node 222. In addition, FIG. 2 shows that corresponding terminals of high side switches 218a, 218b, and 218c are directly connected to high side reference node 228. Moreover, storage capacitor 226, which may be pre-charged, for example, can be utilized as a de facto power supply for one or more of high side switches 218a, 218b, and 218c during operation of power management system 220.

Although FIG. 2 represents single power management system 220 including bi-directional power transfer units 210a-210c sharing low side reference node 222 as a common node, the present inventive principles extend to other and/or more complex configurations. For example, in one embodiment, power management system 220 may be adapted such that low side reference node 222 is not shared in common by bi-directional power transfer units 210a-210c. In addition, in some embodiments, bi-directional power transfer units 210a-210c may be connected in parallel, while in other embodiments bi-directional power transfer units 210a-210c may be connected in series. Moreover, in some embodiments, a system for actively managing energy banks during energy transfer according to the present inventive concepts may comprise a plurality of power management systems 220, configured to connect in series, in parallel, or using a combination of series and parallel arrangements.

Figure 3:
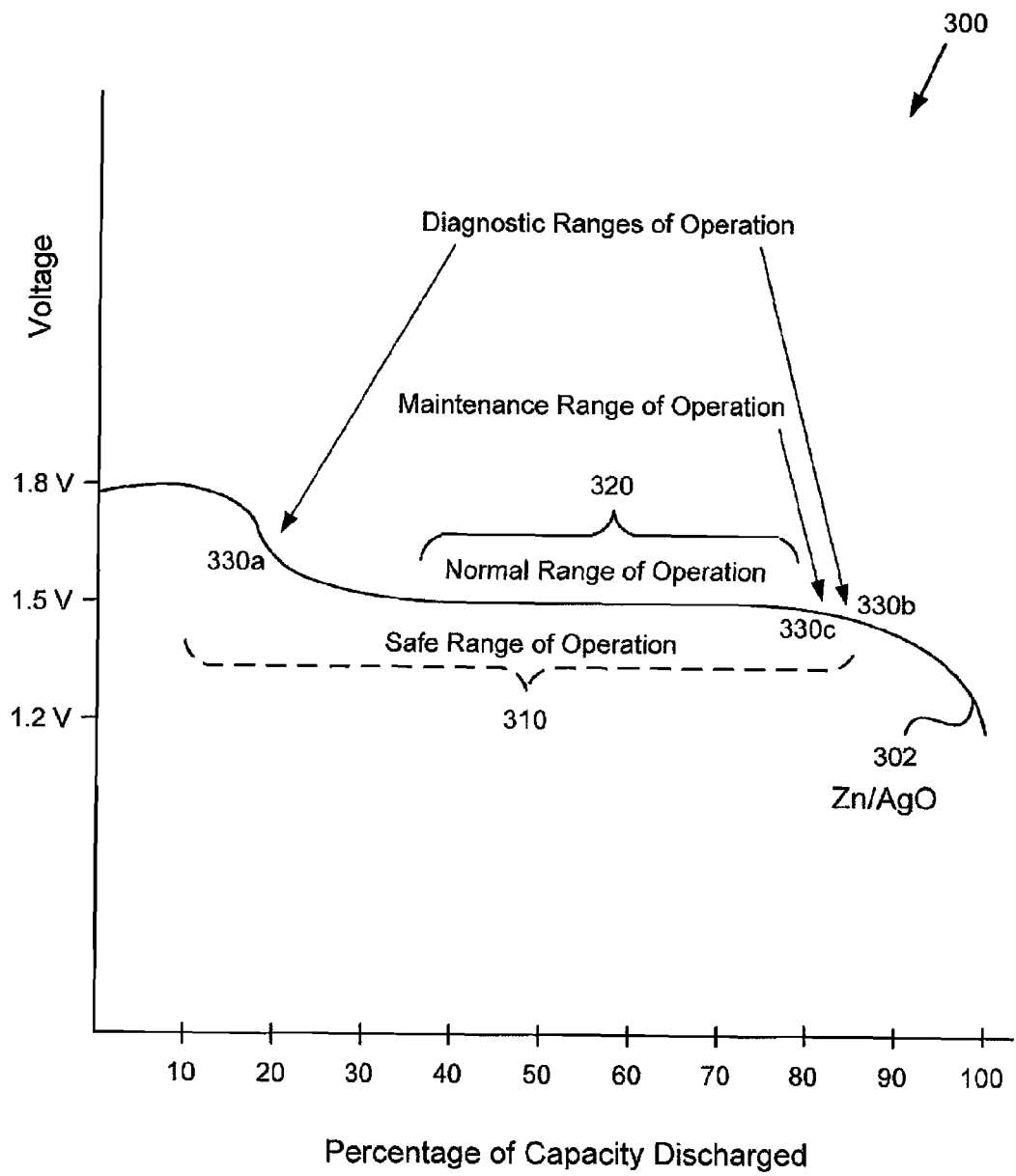
FIG. 3 shows an example discharge profile of an energy bank represented as a silver oxide zinc (Zn/AgO) secondary battery.
Figure 4:
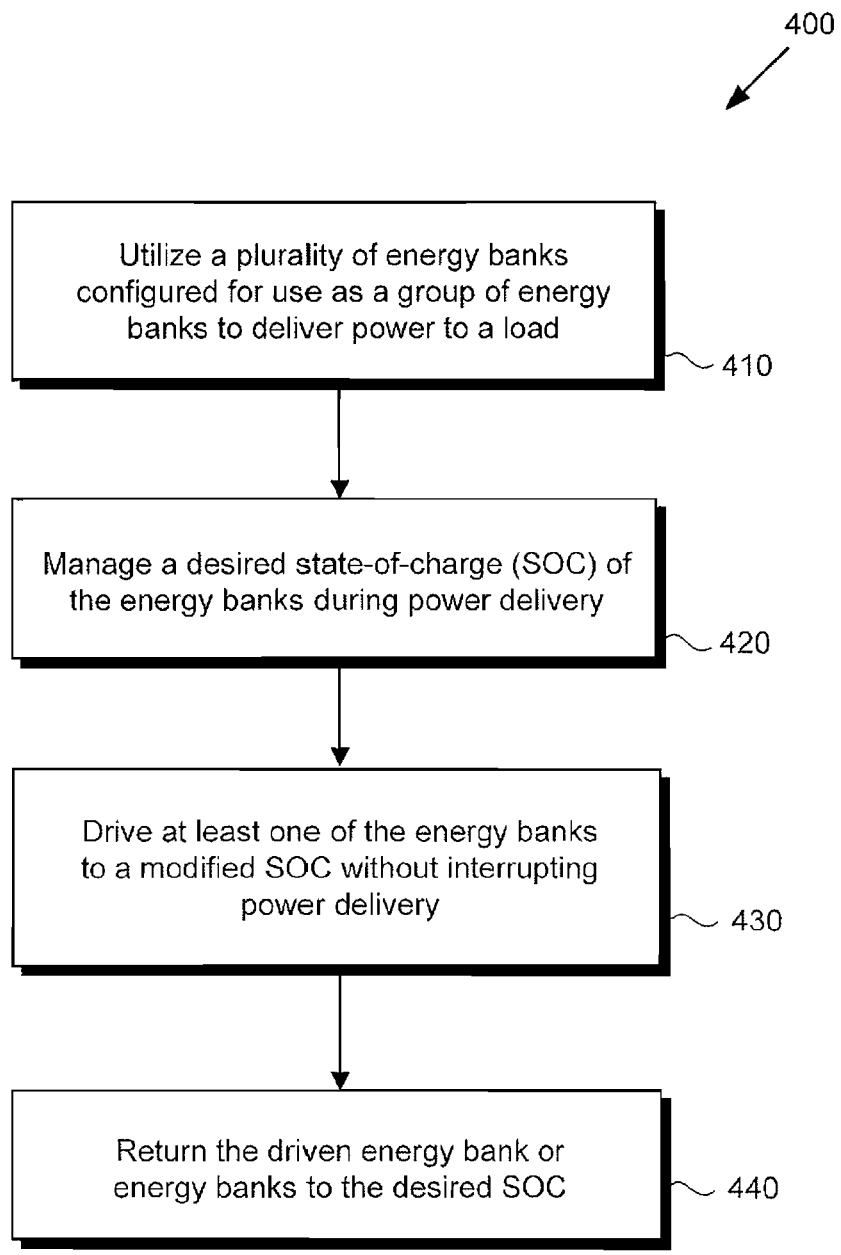
FIG. 4 shows a flowchart presenting a method for actively managing energy banks during energy transfer, according to one embodiment of the present invention.

The operation of system 100 for actively managing energy banks during energy transfer, in FIG. 1, and power management system 220, in FIG. 2, will now be further described in combination with FIGS. 3, and 4. FIG. 3 shows an example discharge profile of an energy bank represented as a silver oxide zinc (Zn/AgO) secondary battery, while FIG. 4 shows a flowchart presenting a method for actively managing energy banks during energy transfer, according to one embodiment of the present invention.

Referring to FIG. 3, graph 300 shows discharge profile 302 of a Zn/AgO secondary battery having a nominal voltage of approximately 1.5 volts during normal operation. As shown in FIG. 3, the Zn/AgO secondary battery is associated with safe range of operation 310 and normal range of operation 320. Normal range of operation 320 is substantially more limited than safe range of operation 310, and as may be seen from FIG. 1, the voltage supplied by the battery is substantially flat across normal range of operation 320. Outside of normal range of operation 320, but within safe range of operation 310 are shown information rich diagnostic ranges of operation 330a and 330b at respectively high and low states-of-charge for the battery, in which battery performance may vary non-linearly with changes in battery SOC. In addition, graph 300 shows example maintenance range of operation 330c at a relatively low SOC of the battery.

Moving now to FIG. 4, FIG. 4 presents flowchart 400 describing one embodiment of a method for actively managing energy banks during energy transfer. Certain details and features have been left out of flowchart 400 that are apparent to a person of ordinary skill in the art. For example, a step may comprise one or more substeps or may involve specialized equipment or materials, as known in the art. While steps 410 through 440 indicated in flowchart 400 are sufficient to describe one embodiment of the present invention, other embodiments of the invention may utilize steps different from those shown in flowchart 400, or may comprise more, or fewer, steps.

Referring to step 410 in FIG. 4, step 410 of flowchart 400 comprises utilizing a plurality of energy banks configured for use as a group of energy banks to deliver power to a load. Referring to FIG. 1, step 410 can be seen to correspond to the implementation of system 100, in which energy banks 104a-104f are coupled in series and used to deliver power to load/generator 102. Although the embodiment shown in FIGS. 1 and 2 represent energy banks coupled in series for use as a group of energy banks, as previously noted, in other embodiments, energy banks 104a-104f may be configured as a parallel group of energy banks, while in yet other embodiments, energy banks 104a-104f may be configured as a group using a combination of series and parallel arrangements.

Continuing to step 420, in FIG. 4, with continued reference to system 100, in FIG. 1, step 420 of flowchart 400 comprises managing a desired SOC of energy banks 104a-104f during power delivery. Step 420 may be performed using power management system 120, in FIG. 1, for example. Managing the desired SOC of energy banks 104a-104f may comprise determining the initial SOC of each of energy banks 104a-104f, balancing energy banks 104a-104f such that some or all of energy banks 104a-104f are placed in a substantially uniform desired SOC characterizing the group, and maintaining those energy banks at a substantially uniform SOC, for example.

It is noted that in the absence of the active management provided by system 100 using power management system 120, all of energy banks 104a-104f would share substantially the same discharge current, e.g., $I_{OUT}$ despite the likely variances among their individual charge capacities and states of charge. However, by discharging, or charging, each of a collection of energy banks at a substantially uniform SOC for all of the energy banks, which is possible when the discharge/charge current for each energy bank is individualized, as shown by individual discharge currents $I_a$-$I_f$ of respective energy banks 104a-104f, the approach to energy bank management disclosed herein compensates for the almost inevitable differences among energy banks 104a-104f.

In order to maintain balance among energy banks 104a-104f while concurrently providing load/generator 102 with the requisite power, supplemental currents are sourced or sunk by power management system 120 through I/O nodes 124a-124f. For example, and assuming that the energy banks have been placed in a balanced state, e.g., at a time prior to the condition shown by FIG. 1 at which each of energy banks 104a-104f shares a desired SOC corresponding to SOC 106, individual variations in the charge capacities of energy banks 104a-104f may result in the discharge current for each being different when the energy banks as a group are discharged at a substantially uniform SOC. Thus, in order to discharge at a substantially uniform SOC while delivering a load current of 300 A, the individual discharge currents for energy banks 104a-104f may vary from as little as 285 A for energy bank 104d, to as much as 315 A for energy bank 104c. The individual discharge currents are designed to supply the required load/generator current while maintaining the desired SOC balance. As shown in FIG. 1, in some embodiments, it may be the case that no individual energy bank will discharge at $I_{OUT}$, e.g., 300 A.

It is noted that energy bank 104d is shown in FIG. 1 to be associated with two different values for discharge current $I_d$, as well as with two different values for each of the supplemental currents sunk/sourced through power management system 120 using respective I/O nodes 124c and 124d. It is to be understood that the values not enclosed in parentheses (e.g., 285 A, 10 A, 30 A) correspond to energy bank 104d being in balance with energy banks 104a, 104b, 104c, 104e, and 104f, while the values in parentheses (e.g., 290 A, 5 A, 25 A) correspond to energy bank 104d being selectively driven to modified SOC 108 using power management system 120.

In FIG. 1, Kirchoff's current law is satisfied at all of I/O nodes 124a-124f, as well as at low side reference node 122. The net effect of power management system 120 is to create supplemental currents that are in parallel with the discharge currents through the respective energy banks. The sum of each parallel supplemental current and its corresponding energy bank discharge current is equal to $I_{OUT}$.

Focusing, for example, on I/O node 124b, I/O node 124b of power management system 120 serves as the output node of energy bank 104b, as well as comprising the input node to energy bank 104c. As shown by FIG. 1, the individual discharge current for energy bank 104b is 290 A, while that of 104c is 315 A. Power management system 120 is configured to supplement the discharge current at I/O node 124b by supplying the difference between the discharge currents of adjoining energy banks 104b and 104c connected to I/O node 124b, e.g., by sourcing 25 A, as shown in FIG. 1. Power management system can draw the current required to supplement the energy transfer rate at I/O node 124b from storage capacitor 126, for example, which can be configured to serve as the source for the supplemental current flowing from power management system 120 through I/O node 124b. Similarly, storage capacitor 126 can serve as the source for the supplemental currents flowing from power management system 120 through respective I/O nodes 124d and 124e.

By contrast, the inflow of current from I/O nodes 124a and 124c to power management system 120s serves as an example of reducing the discharge current at the output of each respective energy bank when the next energy bank has a lower individual discharge current. Referring, for example, to I/O node 124a, that node serves as the output node of energy bank 104a, as well as comprising the input node to energy bank 104b. As shown by FIG. 1, the individual discharge current for energy bank 104a is 305 A, while that of energy bank 104b is 290 A. Power management system 120 is configured to reduce the discharge rate at I/O node 124a by sinking the difference between the individual discharge currents of adjoining energy banks 104a and 104b connected to I/O node 124a, e.g., by sinking 15 A through I/O node 124a, as shown in FIG. 1. Power management system 120 can sink the current required to reduce the energy transfer rate at I/O node 124a by directing that current to storage capacitor 126, for example, which can be configured to serve as the sink for the reduction current flowing to power management system 120 through I/O node 124a. Similarly, storage capacitor 126 can serve as the sink for the reduction currents flowing into power management system 120 through respective I/O nodes 124c and 124f.

Moving now to step 430, in FIG. 4, step 430 of flowchart 400 comprises driving at least one of energy banks 104a-104f to a modified SOC substantially different from the desired SOC of energy banks 104a-104f without interrupting power delivery to load/generator 102. In the embodiment shown in FIG. 1, for example, system 100 uses power management system 120 to selectively drive single energy bank 104d to modified SOC 108 that is significantly different from, e.g., significantly lower than, desired SOC 106 of energy banks 104a, 104b, 104c, 104e, and 104f. As shown in FIG. 1, step 430 may be performed through adjustment of the supplemental current sunk and sourced through power management system 120 using respective I/O nodes 124c and 124d.

For example, by reducing the reduction current sunk through I/O node 124c from 30 A to 25 A and reducing the supplemental current sourced to I/O node 124d from 10 A to 5 A, while leaving the currents through I/O nodes 124a, 124b, 124e, and 124f substantially unchanged, power management system 120 causes discharge current $I_d$ through energy bank 104d to be increased from 285 A to 290 A. However, because that change causes discharge current $I_d$ to deviate from the individualized discharge current for energy bank 104d, e.g., 285 A, necessary to maintain energy banks 104a-104f in balance at a substantially uniform SOC, the SOC of energy bank 104d diverges from SOC 106 common to energy banks 104a, 104b, 104c, 104e, and 104f. Moreover, because that deviation corresponds to an increase in discharge current $I_d$, energy bank 104d discharges at a faster rate than energy banks 104a, 104b, 104c, 104e, and 104f, and is thereby selectively driven to substantially lower SOC 108 through operation of power management system 120, as symbolized by circulating 5 A current 105.

Referring to FIG. 3 in combination with FIG. 1, SOC 106 common to energy banks 104a, 104b, 104c, 104e, and 104f may be seen to correspond to operation of the battery represented by discharge profile 302 in normal range of operation 320, at a discharge percentage less than 50% for example. By contrast, step 430 of flowchart 400 can be seen to correspond to driving the battery represented by discharge profile 302 to a significantly higher percentage of discharge (significantly lower SOC), such as a diagnostic SOC corresponding to diagnostic range of operation 330b, or a maintenance SOC corresponding to maintenance range of operation 330e.

It is noted that it may be advantageous or desirable to drive one or more of energy banks 104a-104f to a modified SOC for any of a variety of reasons. For example, selectively driving the battery represented by discharge profile 302 to an SOC corresponding to diagnostic range of operation 330b (or 330a) may result in the collection of data enabling determination of the fitness or health status of the battery. In addition, some energy bank technologies may require periodic deep battery discharge, for example, as a maintenance procedure. In that case, selectively driving one or more of energy banks 104a-104f to a maintenance SOC corresponding to maintenance range of operation 330c may be periodically desirable. Alternatively, if relatively new replacement energy banks are included among energy banks 104a-104f, they may be discharged at a higher rate and/or to a deeper depth of discharge, e.g., to an SOC corresponding to an operating range outside of normal range of operation 330, to gain a performance advantage while accelerating their wear until their respective operational states more closely match that of the group average.

It is further noted that for some maintenance or diagnostic procedures, such as deep battery discharge, for example, it may be advantageous to drive an energy bank outside of safe range of operation 310. Thus, in some embodiments, step 430 may comprise driving an energy bank, such as energy bank 104d, in FIG. 1, outside of safe range of operation 310, in FIG. 3, for maintenance, diagnostic, or other purposes.

As described above, selectively driving one or more of energy banks 104a-104f, in step 430, may comprise driving them out of a normal range of operation, but that need not necessarily be the case. For example, an energy pack implemented in an electric vehicle may be disproportionately operated through only a limited portion of its normal operating range. As a specific example, an electric automobile may include a battery pack having a normal operating range corresponding to a driving range of approximately forty miles between charges. However, a user of the electric vehicle may consistently drive only ten miles before fully recharging the battery pack. Under those circumstances, battery pack performance and longevity may be enhanced by periodically cycling one or more unit batteries of the pack through its full normal range of operation 320 using power management system 120.

Continuing to step 440 of FIG. 4, step 440 of flowchart 400 comprises returning energy bank 104d to desired SOC 106 shared by energy banks 104a, 104b, 104c, 104e, and 104f. Step 440 can be accomplished in a number of different ways. For example, in one embodiment of the present method, modified SOC 108 may be within normal range of operation 320, in which case energy bank 104d may be maintained at or near modified SOC 108 until energy banks 104a, 104b, 104c, 104e, and 104f are also drawn down to substantially the same level. Alternatively, power management system 120 can be used to source additional current to recharge energy bank 104d while energy banks 104a-104f are concurrently used to deliver power to load/generator 102, until energy banks 104a-104f are balanced at a substantially uniform SOC. Analogously, during recharging of energy banks 104a-104f using recharge current path 103, for example, one or more of energy banks 104a-104f may be selectively driven to a modified SOC significantly higher than a desired SOC of the remaining energy banks. Subsequently, for example after diagnostic data has been collected or a maintenance cycle completed, the driven energy banks may be selectively discharged while system 100 concurrently receives power from a charging system substituted for load/generator 102.

Although the embodiments of the present invention described herein have thus far focused on approaches in which electrical energy is actively managed, the same inventive principles can by applied using other types of energy storage and employing different system topologies. For example, in one embodiment, a power management system can be used to transfer magnetic energy into and out of a magnetic core. In that embodiment, energy could be transferred from a first plurality of energy storage units while energy was being dissipated to a second plurality of energy storage units, with a feedback system configured to maintain a desired flux density inside the magnetic core. In that case, the magnetic core would function as a temporary energy storage node, much like storage capacitor 126 provides that functionality in the embodiment of FIG. 1.

Thus, in a wide variety of possible implementations, embodiments of the present invention enable active management of energy banks, such as secondary batteries, for example, through the redistribution of energy among energy banks while the energy banks are concurrently in use. As a result, diagnostic and maintenance procedures can be performed on an energy pack without interfering with its availability for use, thereby enhancing energy pack performance and longevity while avoiding the expense and inefficiency associated with taking the energy pack offline.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

The invention claimed is:

1. A system for actively managing energy banks during an energy transfer process, said system comprising:
   a plurality of energy banks configured for use as a group of energy banks and characterized by a desired state-of-charge (SOC);
   a power management system coupled across each of said plurality of energy banks;
   said power management system configured to selectively drive at least one of said plurality of energy banks to a modified SOC different from said desired SOC without interrupting said energy transfer process and to return said at least one of said plurality of energy banks to said desired SOC;
   wherein said power management system is configured to return said at least one of said plurality of energy banks to said desired SOC by selectively discharging said at least one of said plurality of energy banks while concurrently receiving power from a generator for recharging said plurality of energy banks.

2. The system of claim 1, wherein said energy transfer process comprises delivering power to a load coupled to said plurality of energy banks.

3. The system of claim 1, wherein said plurality of energy banks comprise secondary batteries.

4. The system of claim 1, wherein said plurality of energy banks are selected from the group consisting of rechargeable automotive batteries, rechargeable industrial batteries, fuel cells, supercapacitors, photovoltaic cells, and photovoltaic panels.

5. The system of claim 1, wherein returning said at least one of said plurality of energy banks to said desired SOC comprises selectively charging said at least one of said plurality of energy banks while concurrently delivering power to a load coupled to said plurality of energy banks.

6. The system of claim 1, wherein said returning said at least one of said plurality of energy banks to said desired SOC comprises selectively discharging said at least one of said plurality of energy banks while concurrently receiving power from said generator for recharging said plurality of energy banks.

7. The system of claim 1, wherein said modified SOC comprises a diagnostic SOC for determining a fitness status of said at least one of said plurality of energy banks.

8. The system of claim 1, wherein said system is configured to maintain said plurality of energy banks, except said at least one of said plurality of energy banks, at a substantially uniform SOC during said energy transfer process.

9. The system of claim 1, wherein said modified SOC comprises a maintenance SOC of said at least one of said plurality of energy banks.

10. The system of claim 1, wherein said modified SOC comprises an SOC outside of a normal operating range for said at least one of said plurality of energy banks.

11. A method for actively managing energy banks during an energy transfer process, said method comprising:
utilizing a plurality of energy banks in said energy transfer process;
managing a desired state-of-charge (SOC) of said plurality of energy banks during said energy transfer process; and
selectively driving at least one of said plurality of energy banks to a modified SOC different from said desired SOC without interrupting said energy transfer process;
returning said at least one of said plurality of energy banks to said desired SOC, wherein said returning said at least one of said plurality of energy banks to said desired SOC includes selectively discharging said at least one of said plurality of energy banks while concurrently receiving power from a generator for recharging said plurality of energy banks.

12. The method of claim 11, wherein said energy transfer process comprises delivering power to a load coupled to said plurality of energy banks.

13. The method of claim 11, wherein said plurality of energy banks comprise secondary batteries.

14. The method of claim 11, wherein said plurality of energy banks are selected from the group consisting of rechargeable automotive batteries, rechargeable industrial batteries, fuel cells, supercapacitors, photovoltaic cells, and photovoltaic panels.

15. The method of claim 11, wherein returning said at least one of said plurality of energy banks to said desired SOC comprises selectively charging said at least one of said plurality of energy banks while concurrently delivering power to a load coupled to said plurality of energy banks.

16. The method of claim 11, wherein returning said at least one of said plurality of energy banks to said desired SOC comprises selectively discharging said at least one of said plurality of energy banks while concurrently receiving power from said generator for recharging said plurality of energy banks.

17. The method of claim 11, wherein said modified SOC comprises a diagnostic SOC for determining a fitness status of said at least one of said plurality of energy banks.

18. The method of claim 11, further comprising maintaining said plurality of energy banks, except said at least one of said plurality of energy banks, at a substantially uniform SOC during said energy transfer process.

19. The method of claim 11, wherein said modified SOC comprises a maintenance SOC of said at least one of said plurality of energy banks.

20. The method of claim 11, wherein said modified SOC comprises an SOC outside of a normal operating range for said at least one of said plurality of energy banks.

* * * * *